(12) United States Patent
Nagahara et al.

(10) Patent No.: US 9,709,882 B2
(45) Date of Patent: Jul. 18, 2017

(54) LIGHT SOURCE APPARATUS AND PROJECTOR HAVING LIGHT SOURCE APPARATUS

(71) Applicant: NICHIA CORPORATION, Anan-shi, Tokushima (JP)

(72) Inventors: Seiji Nagahara, Yokohama (JP); Takashi Sasamuro, Yamato (JP)

(73) Assignee: NICHIA CORPORATION, Anan-Shi (JP)

( * ) Notice: Subject to any disclaimer, the term of this patent is extended or adjusted under 35 U.S.C. 154(b) by 0 days.

(21) Appl. No.: 14/838,443

(22) Filed: Aug. 28, 2015

(65) Prior Publication Data

US 2016/0062224 A1 Mar. 3, 2016

(30) Foreign Application Priority Data

Aug. 29, 2014 (JP) ................. 2014-176360

(51) Int. Cl.
  *G03B 21/20* (2006.01)
  *G02B 27/10* (2006.01)
  *G03B 33/06* (2006.01)

(52) U.S. Cl.
  CPC ......... *G03B 21/208* (2013.01); *G02B 27/102* (2013.01); *G03B 21/2013* (2013.01); *G03B 21/2033* (2013.01); *G03B 33/06* (2013.01)

(58) Field of Classification Search
  CPC .............. G03B 21/208; G03B 21/2033; H04N 9/3105; H04N 9/3111; H04N 9/3138; H04N 9/3152; H04N 9/3161
  See application file for complete search history.

(56) References Cited

U.S. PATENT DOCUMENTS

| 2003/0147055 | A1 | 8/2003 | Yokoyama |
| 2007/0098324 | A1* | 5/2007 | Kitamura ............. G02B 5/1861 |
| | | | 385/37 |
| 2007/0252504 | A1 | 11/2007 | Konno et al. |
| 2011/0188003 | A1* | 8/2011 | Furutachi ............... G03B 21/20 |
| | | | 353/34 |

(Continued)

FOREIGN PATENT DOCUMENTS

| JP | 2000-112031 A | 4/2000 |
| JP | 2005-300712 A | 10/2005 |

(Continued)

*Primary Examiner* — Sultan Chowdhury
(74) *Attorney, Agent, or Firm* — Squire Patton Boggs (US) LLP

(57) ABSTRACT

There is provided a light source apparatus and projector having the light source apparatus, said light source apparatus comprising: a laser module where first semiconductor laser(s) and second semiconductor laser(s) which emits a light of the wavelength different from that of said first semiconductor laser(s) are placed such that the emitting direction of each semiconductor laser is approximately the same and a short axis direction of a far field pattern of each semiconductor laser is approximately the same, and an optical multiplexing component which a light which exits from said laser module enters without being converged, wherein said first semiconductor laser(s) and said second semiconductor laser(s) are placed in linear symmetry in said short axis direction at the exit surface of said laser module.

19 Claims, 13 Drawing Sheets

(56) References Cited

U.S. PATENT DOCUMENTS

| | | |
|---|---|---|
| 2012/0140185 A1 | 6/2012 | Masuda |
| 2012/0249918 A1* | 10/2012 | Yasui .................... G02B 27/48 349/61 |
| 2013/0010002 A1* | 1/2013 | Takahashi .......... G02B 27/1033 345/690 |
| 2013/0258294 A1* | 10/2013 | Kaneda ................. G02B 27/48 353/38 |
| 2014/0347566 A1 | 11/2014 | Katou |
| 2015/0029467 A1 | 1/2015 | Sugiyama et al. |

FOREIGN PATENT DOCUMENTS

| | | |
|---|---|---|
| JP | 2007-318066 A | 12/2007 |
| JP | 2011-076781 A | 4/2011 |
| JP | 2012-123967 A | 6/2012 |
| JP | 2015-025832 A | 2/2015 |
| WO | WO 2012/086011 A1 | 6/2012 |

* cited by examiner

Section A-A

FIG.4A
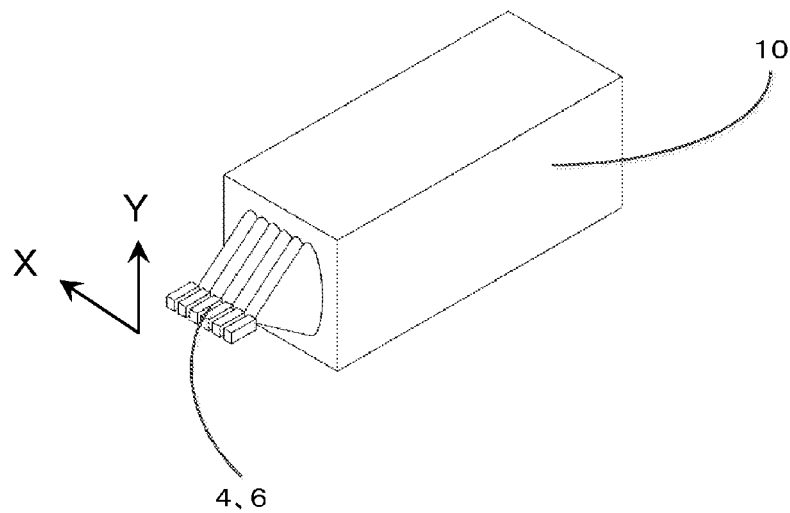
FIG.4B
Wavelength Range Arrangement
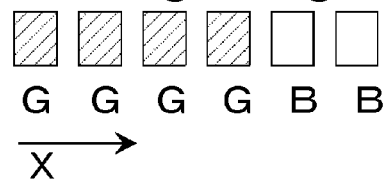
G G G G B B
X →
**Light Intensity Distribution
(Blue) just after exiting from
Optical Multiplex Component**
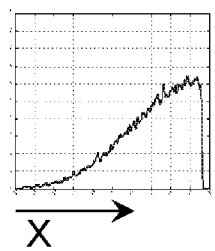
X →

FIG.5A

Wavelength Range Arrangement

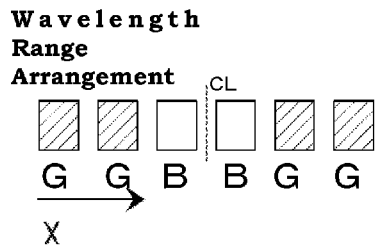

G G B B G G
→
X

Light Intensity Distribution (Blue) just after exiting from Optical Multiplex Component

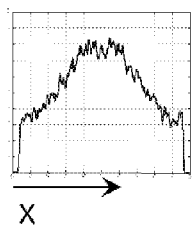

Wavelength Range Arrangement

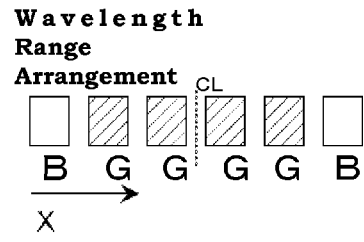

B G G G G B
→
X

Light Intensity Distribution (Blue) just after exiting from Optical Multiplex Component

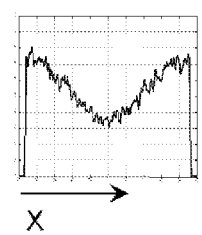

Wavelength Range Arrangement

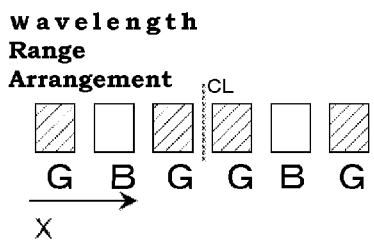

G B G G B G
→
X

Light Intensity Distribution (Blue) just after exiting from Optical Multiplex Component

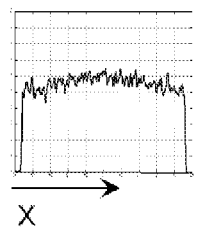

X

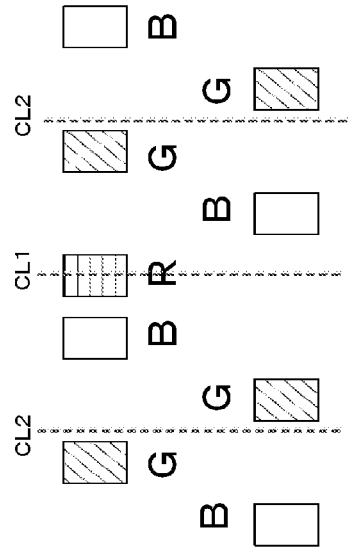
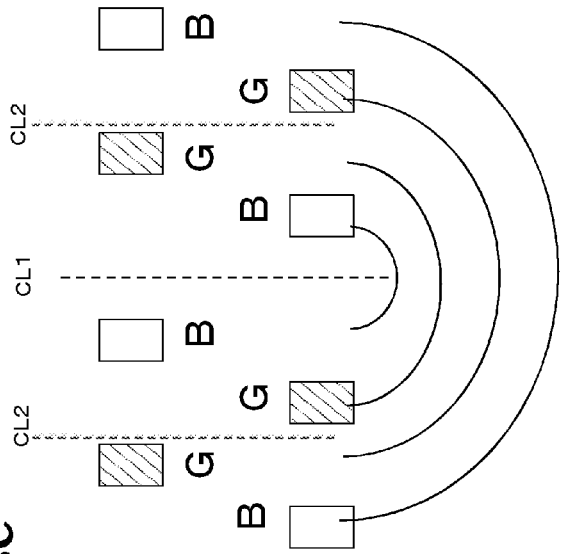
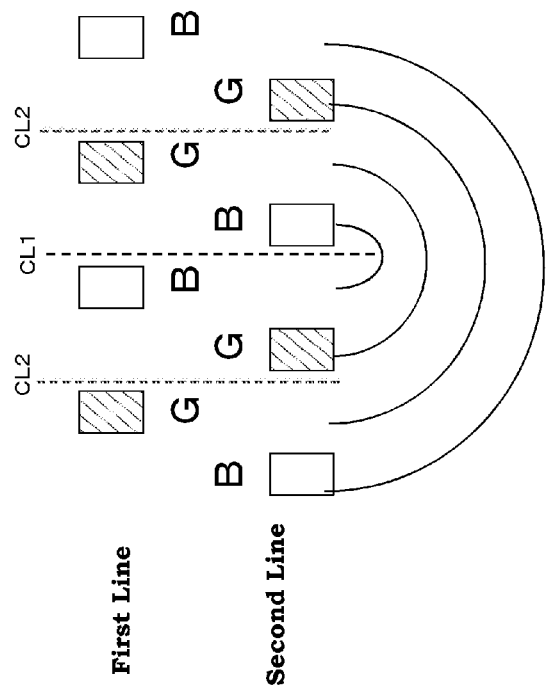
FIG.13A
FIG.13B
FIG.13C

LIGHT SOURCE APPARATUS AND PROJECTOR HAVING LIGHT SOURCE APPARATUS

CROSS-REFERENCE TO RELATED APPLICATIONS

The present application claims priority under 35 U.S.C. §119 to Japanese Patent Application No. 2014-176360, filed on Aug. 29, 2014. The content of this application is incorporated herein by reference in their entirety.

BACKGROUND OF THE INVENTION

Field of the Invention

The disclosure relates to a light source apparatus and a projector having the light source apparatus.

Description of the Related Art

As a light source apparatus used in the projector or the like, a discharge type light source such as an extra-high pressure mercury lamp, a xenon lamp or the like had been used. Recently, however, it is proposed to use a semiconductor laser or a light emitting diode as a light source apparatus used in the projector or the like. In the light source apparatus using the semiconductor laser, as described in JP 2011-76781 A, there is proposed a light source apparatus which uses a plurality of semiconductor lasers (such as a blue light semiconductor lasers) and phosphors excited by the semiconductor lasers in order to present a light of desired color such as white color.

The light source apparatus as described in JP 2011-76781 A has a rotating phosphor wheel which outputs lights of different wavelengths (such as red color lights, green color lights and blue color lights) in a time divisional manner, and an optical modulating device such as the DMD (Digital Micro mirror Device) in order to make images.

In the light source apparatus as described in JP 2000-112031 A, lights of different wavelengths are emitted by a plurality light emitting diodes, and images are formed by an optical modulating device such as a liquid crystal panel.

Therefore, in order to make images, it is necessary to project a light to the optical modulating device with spatial uniformity. In this case, since a light emitted from the semiconductor laser has directivity in comparison with a light emitted from the light emitting diode, it is difficult to multiplex lights in uniformity. Therefore, it is necessary to make a total length of the optical multiplexing component longer in order to obtain a uniform light intensity distribution at the exist surface of the optical multiplexing component. Accordingly, it becomes difficult to downsize the light source apparatus, and therefore, it also becomes difficult to downsize a projector which uses the light source apparatus.

SUMMARY OF THE INVENTION

One aspect of the light source apparatus according to the present invention is a light source apparatus comprising:
a laser module where first semiconductor laser(s) and second semiconductor laser(s) which emits a light of the wavelength different from that of said first semiconductor laser(s) are placed such that the emitting direction of each semiconductor laser is approximately the same and a short axis direction of a far field pattern of each semiconductor laser is approximately the same, and
an optical multiplexing component which a light which exits from said laser module enters without being converged, wherein said first semiconductor laser(s) and said second semiconductor laser(s) are placed in linear symmetry in said short axis direction at the exit surface of said laser module.

One aspect of the projector according to the present invention is a projector comprising:
the light source apparatus as mentioned above, and
an optical system for forming images according to the light which exits from said light source apparatus.

BRIEF DESCRIPTION OF THE DRAWINGS

FIG. 4A illustrates a perspective view for describing that a diverging light enters the optical multiplexing component from the laser module having one line where the semiconductor lasers are aligned in the short axis direction, FIG. 4B illustrates figures showing an example of the ordinary arrangement of the semiconductor lasers and a light intensity distribution of the light just after exiting from the optical multiplexing component according to such ordinary arrangement.

FIGS. 5A to 5C illustrate figures for describing examples of the arrangement of the semiconductor lasers according to the first embodiment of the present invention and light intensity distributions of the light just after exiting from the optical multiplexing component according to the examples.

FIGS. 13A to 13C illustrate schematic diagrams for describing examples of the arrangement of the semiconductor lasers according to the second embodiment of the present invention.

DESCRIPTION OF EMBODIMENTS

Figure 1A:
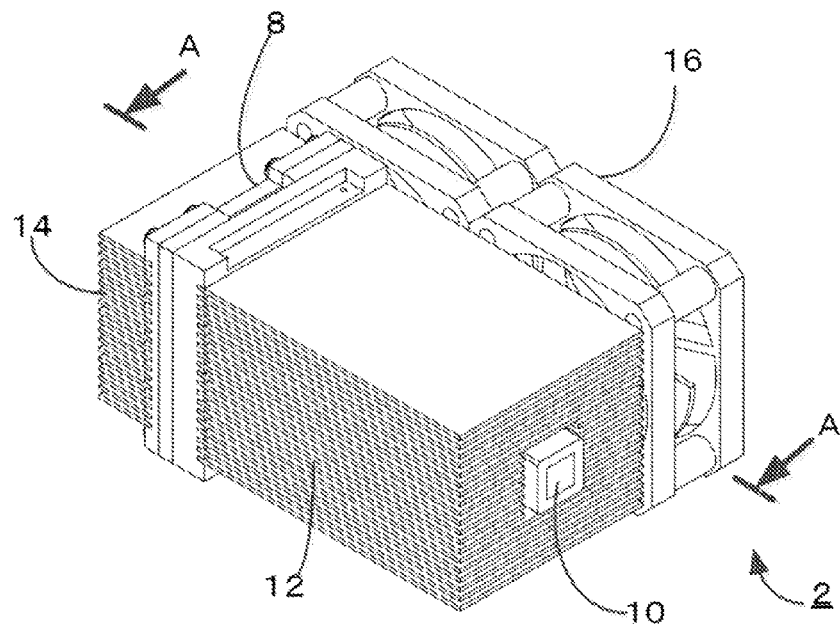
FIG. 1A illustrates a perspective view for describing the outline of the light source apparatus.

The light source apparatus according to Aspect 1 of the present invention is a light source apparatus comprising:

a laser module where first semiconductor laser(s) and second semiconductor laser(s) which emits a light of the wavelength different from that of said first semiconductor laser(s) are placed such that the emitting direction of each semiconductor laser is approximately the same and a short axis direction of a far field pattern of each semiconductor laser is approximately the same, and an optical multiplexing component which a light which exits from said laser module enters without being converged, wherein said first semiconductor laser(s) and said second semiconductor laser(s) are placed in linear symmetry in said short axis direction at the exit surface of said laser module.

According to this aspect, it is possible to obtain a uniform optical intensity distribution at the exit surface of the optical multiplexing component using the optical multiplexing component having a short total length.

According to the description of "said first semiconductor laser(s) and said second semiconductor laser(s) are placed in linear symmetry in said short axis direction at the exit surface of said laser module", it can be said that at least one of the first or second semiconductor laser(s) will have a plurality of semiconductor lasers in the laser module.

The light source apparatus according to Aspect 2 of the present invention is the light source apparatus according to the above mentioned Aspect 1, wherein in each group of the semiconductor lasers divided by a center axis of said linear symmetry, on the condition that if the semiconductor laser exists at the location of said center axis, such semiconductor laser is excluded from the group, said first semiconductor laser(s) and said second semiconductor laser(s) are placed in linear symmetry in said short axis direction.

According to this aspect, it is possible to obtain a more uniform optical intensity distribution at the exit surface of the optical multiplexing component in comparison with the above mentioned Aspect 1.

The light source apparatus according to Aspect 3 of the present invention is a light source apparatus comprising:

a laser module where first semiconductor laser(s) and second semiconductor laser(s) which emits a light of the wavelength different from that of said first semiconductor laser(s) are placed such that the emitting direction of each semiconductor laser is approximately the same and a short axis direction of a far field pattern of each semiconductor laser is approximately the same, and an optical multiplexing component which a light which exits from said laser module enters without being converged, wherein a plurality of lines where said first semiconductor laser(s) and said second semiconductor laser(s) are aligned in said short axis direction are placed at the exit surface of said laser module, wherein if only one semiconductor laser exists in the direction vertical to said lines, and said one semiconductor would be aligned in the same line of other semiconductor(s) by moving in the direction vertical to said lines, said first semiconductor laser(s) and said second semiconductor laser(s) are placed in linear symmetry in said short axis direction.

According to this aspect, since a diverging angle of a diverging light emitted by the semiconductor laser in a long axis direction is larger than that in the short axis direction, it is possible to obtain a uniform optical intensity distribution at the exit surface of the optical multiplexing component using the optical multiplexing component having a short total length, even in the case that the laser module has the plurality of the lines of the semiconductor lasers.

The light source apparatus according to Aspect 4 of the present invention is the light source apparatus according to the above mentioned Aspect 3, wherein in each group of the semiconductor laser(s) divided by a center axis of said linear symmetry, on the condition that if the semiconductor laser exists at the location of said center axis, such semiconductor laser is excluded from the group, said first semiconductor laser(s) and said second semiconductor laser(s) are placed in linear symmetry in said short axis direction.

According to this aspect, it is possible to obtain a more uniform optical intensity distribution at the exit surface of the optical multiplexing component in comparison with the above mentioned Aspect 3, even in the case that the laser module has the plurality of the lines of the semiconductor lasers.

The light source apparatus according to Aspect 5 of the present invention is the light source apparatus according to any one of the above mentioned Aspects 1 to 4, wherein said first semiconductor laser(s) and said second semiconductor laser(s) are semiconductor laser(s) which emits a light in a green light range, and semiconductor laser(s) which emits a light in a blue light range.

It is possible to obtain a projector or a display device which can output desired lights by using the light source apparatus according to this aspect.

The light source apparatus according to Aspect 6 of the present invention is the light source apparatus according to the above mentioned Aspect 5, wherein at the exit surface of said laser module, a line where said first semiconductor laser(s) and said second semiconductor laser(s) are aligned in said short axis direction, and a line where semiconductor laser(s) which emits a light in a red light range is aligned.

According to this aspect, it is possible to provide the light source apparatus which can output a white light with high performance.

The light source apparatus according to Aspect 7 of the present invention is the light source apparatus according to any one of the above mentioned Aspects 1 to 6, wherein the wavelength ranges of said laser module include:

a red light range from 600 nm to 650 nm, a green light range from 500 nm to 550 nm, and a blue light range firm 440 nm to 490 nm.

It is possible to obtain a projector or a display device which can output desired lights by using the light source apparatus according to this aspect.

The light source apparatus according to Aspect 8 of the present invention is the light source apparatus according to any one of the above mentioned Aspects 1 to 7, wherein said optical multiplexing component is a solid rod integrator or a hollow light pipe, and said optical multiplexing component has a shape of a square pole whose light transmitting sectional surface is approximately vertical to an optical axis of the light which exists from said semiconductor laser, and an area of the sectional surface of said optical multiplexing component is larger than a light emission area of the exit surface of said laser module.

According to this aspect, since the area of the sectional surface of the optical multiplexing component is larger than the luminescence area of the exit surface of the laser module, a diverging light which exits from the laser module can surely enter the optical multiplexing component.

The light source apparatus according to Aspect 9 of the present invention is the light source apparatus according to any one of the above mentioned Aspects 1 to 8, wherein a width dimension which is a dimension of said optical multiplexing component in said short axis direction is smaller than "a total luminance point length+(a minimum one of adjacent luminance point lengths×4)", said total luminance point length being a distance of the optical axes of the semiconductor lasers located at the both ends in said short axis direction, and said adjacent luminance point length being a distance of the optical axes of the semiconductor lasers located adjacently in said short axis direction.

By fulfilling the conditions of this aspect, it is possible to surely obtain a uniform optical intensity distribution at the exit surface of the optical multiplexing component using the optical multiplexing component having a short total length.

The light source apparatus according to Aspect 10 of the present invention is the light source apparatus according to any one of the above mentioned Aspects 1 to 9, wherein in the plurality of semiconductor lasers, a maximum one of the adjacent luminance point lengths is smaller than (a minimum one of adjacent luminance point lengths×3), said adjacent luminance point length being a distance of the optical axes of the semiconductor lasers located adjacently in said short axis direction.

By fulfilling the conditions of this aspect, it is possible to surely obtain a uniform optical intensity distribution at the exit surface of the optical multiplexing component using the optical multiplexing component having a short total length.

The light source apparatus according to Aspect 11 of the present invention is the light source apparatus according to any one of the above mentioned Aspects 1 to 10, wherein if a length dimension which is a dimension of said optical multiplexing component in a light transmitting direction being L, a width dimension which is a dimension of said optical multiplexing component in said short axis direction being D, a diverging angle in said short axis direction being $\theta_x$, and a refractive index being n,
the following formulas are fulfilled:

$$\frac{1}{2}D\sqrt{\frac{n^2 - NA^2}{NA^2}} < L < \frac{3}{2}D\sqrt{\frac{n^2 - NA^2}{NA^2}}$$

$$NA = \sin(\theta_x).$$

By fulfilling the conditions of this aspect, it is possible to surely obtain a uniform optical intensity distribution at the exit surface of the optical multiplexing component using the optical multiplexing component having a short total length.

The light source apparatus according to Aspect 12 of the present invention is the light source apparatus according to any one of the above mentioned Aspects 1 to 11, wherein if a length dimension which is a dimension of said optical multiplexing component in a light transmitting direction being L, a width dimension which is a dimension of said optical multiplexing component in said short axis direction being D, the following formula is fulfilled:

$$L<22<D.$$

By fulfilling the conditions of this aspect, it is possible to surely obtain a uniform optical intensity distribution at the exit surface of the optical multiplexing component using the optical multiplexing component having a short total length.

A projector according to Aspect 1 of the present invention comprising:

the light source apparatus according to any one of Aspects 1 to 12, and an optical system for forming images according to the light which exits from said light source apparatus.

As mentioned above, according to the above mentioned aspects, it is possible to obtain a uniform optical intensity distribution at the exit surface of the optical multiplexing component using the optical multiplexing component having a short total length, and thereby achieving a light source apparatus with a compact body and high performance. Accordingly, it is also possible to provide a projector with a compact body and high performance, by having this light source apparatus.

(General Description of Light Source Apparatus)

A light source apparatus and a projector having the light source apparatus according to embodiments of the present invention will hereinafter be described in detail with referring to drawings. At first, a light source apparatus according to one embodiment of the present invention is described with referring to FIGS. 1A to B and FIGS. 2A to C. In FIG. 1A, it illustrates a perspective view for describing the outline of the light source apparatus, and in FIG. 1B, it illustrates a sectional view seen from the arrow A-A of FIG. 1A. FIGS. 2A to 2B illustrate perspective views for schematically describing a construction of the laser module.

Figure 1B:
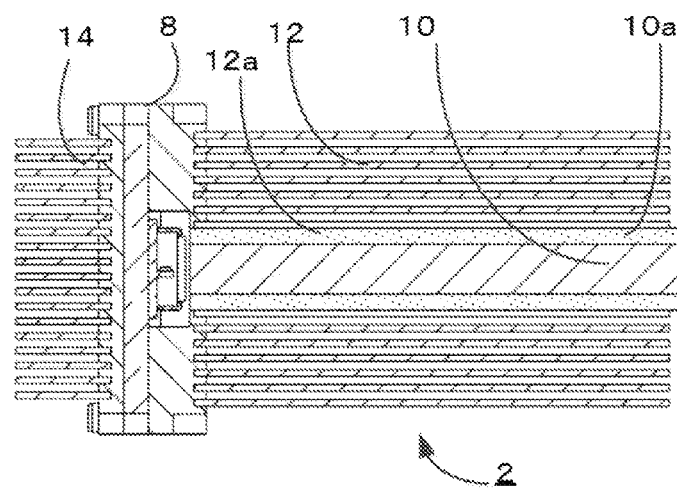
FIG. 1B illustrates a sectional view for describing the outline of the light source apparatus.
Figure 2A:
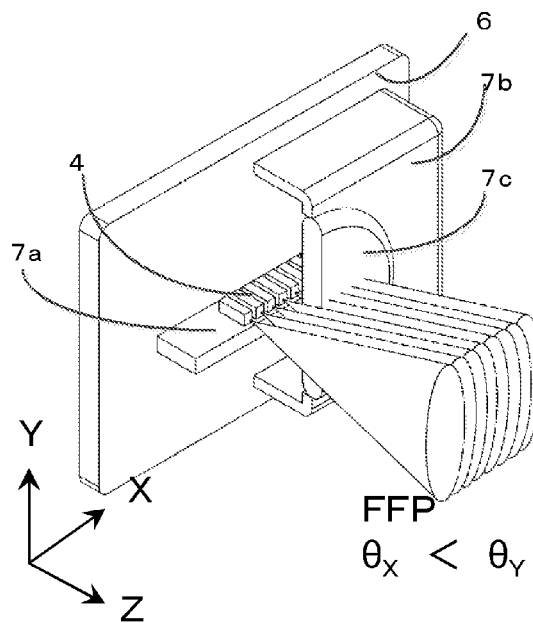
FIG. 2A illustrates a perspective view for schematically describing a construction of the laser module having one line where the semiconductor lasers are aligned in the short axis direction thereof.
Figure 2B:
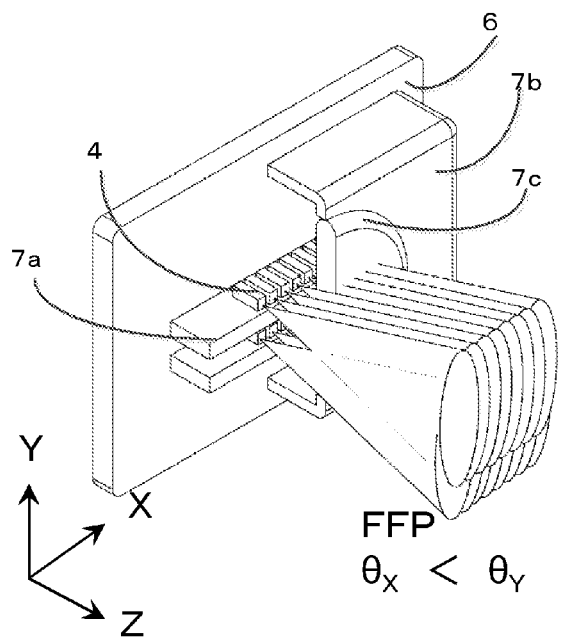
FIG. 2B illustrates a perspective view for schematically describing a construction of the laser module having two lines where the semiconductor lasers are aligned in the short axis direction thereof.

As illustrated in FIGS. 1A to 1B, the light source apparatus 2 has a holding member 8 which holds a laser module which mounts a plurality of semiconductor lasers (it is also called "semiconductor laser elements"), a first heat dissipating member 12 to be connected with the holding member 8 in the light emitting direction, and a second heat dissipating member 14 to be connected with the holding member 8 in the opposite direction to the light emitting direction. The first and second heat dissipating members 12, 14 have a function to cool the laser module whose temperature becomes high mainly due to the heat generated by the semiconductor lasers. The first and second heat dissipating members 12, 14 have many fins and perform air cooling with using cooling surfaces of the fins. At this moment, in order to enhance cooling performance of the fins, there is provided a cooling fan 16 which makes an air flow between the adjacent fins of the first and the second heat dissipating members 12, 14.

Further, a through hole portion 12a through which a light which exits from the laser module passes is provided in the first heat dissipating members 12, and an optical multiplexing component 10 is placed such that it passes through the through hole portion 12a of the first heat dissipating members 12. A light which exits from the laser module enters the optical multiplexing component 10 without being converged, and is propagated in the optical multiplexing component 10, and then exits to the right side according to the sectional view in FIG. 1B. The optical multiplexing component 10 is an optical member formed by transparent glass or the like. In order to hold the optical multiplexing component 10 in the first heat dissipating members 12 without damaging the optical multiplexing component 10, a holder 10a formed by metal (for example, aluminum) or the like which has high heat conductivity is placed between the optical multiplexing component 10 and the through hole portion 12a.

Figure 2C:
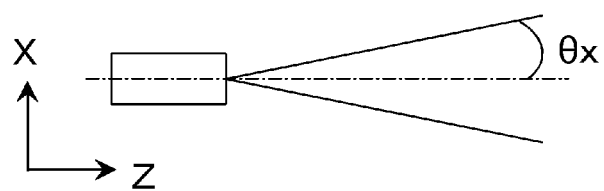
FIG. 2C illustrates a diverging light which exits from the laser module.

As illustrated in FIGS. 2A to 2C, a plurality of semiconductor lasers 4 are placed in the laser module. Specifically, at least two kinds of semiconductor lasers 4 which emit lights of different wavelengths are placed. In FIGS. 2A to 2C, in order to make the semiconductor lasers visible, it is illustrated such that a part of the member which covers the semiconductor lasers is cut off. Further, in order to simplify the construction, it is illustrated such that the semiconductor lasers 4 are placed on a base portion 7a having a shelf type shape. The semiconductor lasers 4 are surrounded by a cap portion 7b and a window portion 7c, and thereby being sealed. The window portion 7c is formed by a transparent member, and therefore a light which exists from the semiconductor lasers 4 passes through it. The light which exits from the semiconductor lasers 4 enters the optical multiplexing component 10 without being converged by the window portion 7c.

While a light which exits from the laser module 6 is a diverging light (refer to FIG. 2C), it is possible to make the light which exits from the laser module 6 enter the optical multiplexing component 10, and be propagated in the optical multiplexing component 10, and then exit from the optical multiplexing component 10, by placing the optical multiplexing component 10 close to the exit surface of the laser module 6 as illustrated in FIGS. 1A to 1B. At this moment, it is possible to make a light intensity distribution uniform by propagating the light which exits from the semiconductor laser in the optical multiplexing component 10. However, as described below, since the light intensity distribution is made uniform by reflection of the light at the inner surfaces of the optical multiplexing component 10 during the propagation of the light in the optical multiplexing component 10, the optical multiplexing component 10 needs the propagation distance corresponding to the required uniformity.

As mentioned above, the first heat dissipating members 12 and the second heat dissipating members 14 are provided for cooling the laser module 6 or the like, and the optical multiplexing component 10 is placed such that it passes through the through hole portion 12a of the first heat dissipating members 12. In this case, the optical multiplexing component 10 needs to be protruded outside from the surface of the first heat dissipating members 12 at the light exiting side. While a diverging light which exits from the laser module 6 enters the optical multiplexing component 10 directly, the light which exits from the optical multiplexing component 10 has the same angle as that of the diverging light which exits from the laser module 6. Therefore, in order to prevent the light which exits from the optical multiplexing component 10 being blocked by the first heat dissipating members 12, the optical multiplexing component 10 needs to be protruded outside from the surface of the first heat dissipating members 12 at the light exiting side.

According to such configuration, a space around the optical multiplexing component 10 can be used for dissipating the heat of the laser module 6, and therefore, the light source apparatus 2 including the heat dissipating members can be downsized. Further, if the heat is dissipated sufficiently by the first heat dissipating members 12, the second heat dissipating members 14 can be omitted. In this case, the light source apparatus 2 can be downsized more.

(Description of Laser Module)

As illustrate in FIGS. 2A to 2C, the semiconductor laser 4 emits a diverging light which spreads out in an ellipse shape. In this case, a light density distribution which is measured in the horizontal direction and the vertical direction to the active layer of the semiconductor laser is called a far field pattern, and FIGS. 2A to 2C indicate as FFP (Far Field Pattern). In FIGS. 2A to 2C, it is defined that the horizontal direction is X direction, the vertical direction is Y direction, and the light exiting direction is Z direction. Thus, the XY surface becomes the exit surface of the laser module 6. In FIGS. 2A to 2C, the active layer of the semiconductor laser is placed along the X direction. The direction in parallel with the active layer is the X axis direction, and the direction in perpendicular to the active layer is the Y axis.

In this case, if a diverging angle in the X axis direction is $\theta_X$ (refer to FIG. 2C), and a diverging angle in the Y axis direction is $\theta_Y$, $\theta_X$ is smaller than $\theta_Y$ ($\theta_X<\theta_Y$). Thus, the X axis direction becomes a short axis of the ellipse shape, and the Y axis direction becomes a long axis of the ellipse shape.

In this embodiment, the semiconductor lasers 4 are placed with being aligned along the X axis which is the short axis direction. In FIG. 2A, it illustrates a case having one line where the semiconductor lasers 4 are aligned in the X axis (short axis) direction, and in FIG. 2B, it illustrates a case having two lines where the semiconductor lasers 4 are aligned in the X axis (short axis) direction. More specifically, the laser module 6 as shown in FIG. 2A has one line where the eight semiconductor lasers 4 are aligned, and outputs total eight diverging lights. The laser module 6 as shown in FIG. 2B has two lines where the eight semiconductor lasers 4 are aligned, and outputs total sixteen diverging lights.

It is not definitely necessary to form the line where the semiconductor lasers 4 are aligned in the X axis (short axis) direction. It is enough that at least the semiconductor lasers 4 are placed in the X axis (short axis) direction. Even in this case, each semiconductor laser 4 can outputs, in the Z direction, the diverging light which spreads over in the ellipse shape where the X axis becomes the short axis and the Y axis becomes the long axis.

In FIGS. 2A to 2C, while the diverging lights emitted by the semiconductor lasers 4 are directly outputted from the laser module 6, the exit surface of the semiconductor lasers 4 does not need to be in parallel with the XY surface. For example, the exit surfaces of the semiconductor lasers 4 can be placed in parallel with the XZ surface, and the light is outputted from the exit surface of the laser module 6 in the Z direction by reflecting the light with using a 45 degrees mirror.

In the case of FIG. 2B, it can be arranged such that a luminance point length of laser module 6 in the X direction is similar to a luminance point length of laser module 6 in the Y direction.

A plurality of semiconductor lasers in a plurality of wavelength ranges can be mounted in the laser module 6. In general, relating to a visual light, any color can be presented by a red color light, a green color light and blue color light. Specifically, it is preferable to provide any one of a semiconductor laser 4R in a red light range from 600 nm to 650 nm, a semiconductor laser 4G in a green light range from 500 nm to 550 nm, a semiconductor laser 4B in a blue light range from 440 nm to 490 nm, or the combination thereof in the laser module.

For example, it is possible to obtain a projector or a display device which outputs any light of desired color including white color with using the light source apparatus 2 using the semiconductor laser 4G which emits a light in a green color range and the semiconductor laser 4B which emits a light in a blue color range, or the light source apparatus 2 additionally using the semiconductor laser 4R which emits a light in a red color range.

Figure 3:
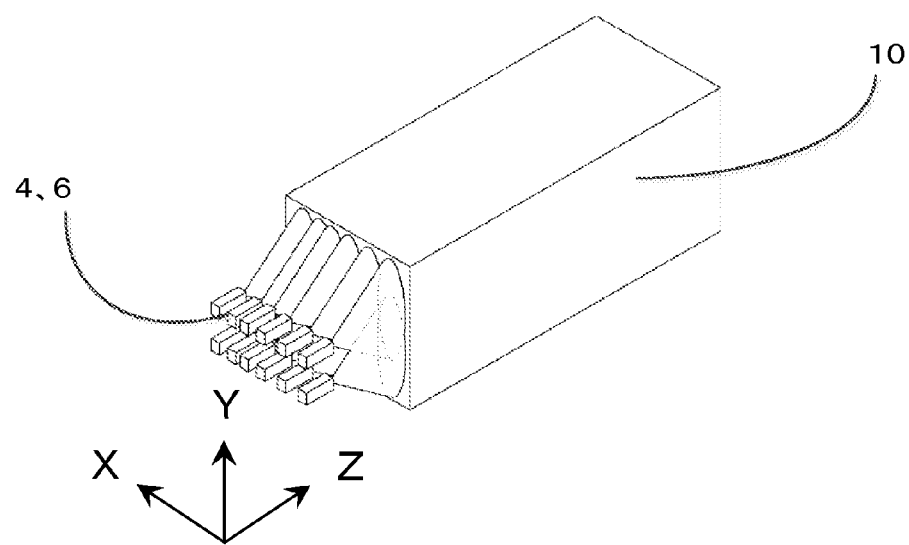
FIG. 3 illustrates a perspective view for describing that a diverging light enters the optical multiplexing component from the laser module having one line where the semiconductor lasers are aligned in the short axis direction.

Next, with referring to FIG. 3, the optical multiplexing component 10 is further described in detail. FIG. 3 illustrates a perspective view for describing the outline of the optical multiplexing component 10, being seen from the surface which a diverging light which exits from the laser module 6 (the semiconductor lasers 4) enters. As illustrated in FIG. 3, the diverging light which exits from the laser module 6 (the semiconductor lasers 4) directly enters the optical multiplexing component 10 without passing through any optical system.

As the optical multiplexing component 10, it can be a solid rod integrator or a hollow light pipe whose inner surface is formed by a reflecting film, and it is a square pole whose sectional surface where a light is propagated is placed in parallel with the XY surface. The solid rod integrator is preferably formed by glass which is transparent in the visual light range, and more preferably formed by synthetic quartz, BK-7 or the like. Since the synthetic quartz has a very low coefficient of thermal expansion, it is also suitable for the optical material for high accuracy. BK-7 is a borosilicate glass. It is good for transmitting electromagnetic waves in the range from 350 nm to 2000 nm, and it is a homogenous optical material with low cost having less bubbles or impurities.

Since a diverging light is emitted by the semiconductor lasers 4, it is preferable that an area of the sectional surface of the optical multiplexing component 10 is larger than a light emission area of the exit surface of the laser module 6.

Accordingly, the diverging light which exits from the laser module 6 can surely enter the optical multiplexing component 10.

(Description of Arrangement of Semiconductor Laser of Different Wavelength)

With referring to FIGS. 4A to 4B, in the light source apparatus having the semiconductor lasers of different wavelengths, the ordinary arrangement of the semiconductor lasers is described. In FIG. 4A, it illustrates a perspective view for describing that a diverging light enters the optical multiplexing component 10 from the laser module 6 having one line where the semiconductor lasers 4 are aligned in the X axis (short axis) direction. This figure can be used both for the ordinary arrangement of the semiconductor lasers and the arrangement of the semiconductor lasers according to the embodiments of the present invention. In the laser module 6 having the semiconductor lasers 4 in the plurality of wavelength ranges as illustrated in FIG. 4A, wiring work can be performed easily if the semiconductor lasers 4 in the same wavelength range are placed in the same location in the case of driving the semiconductors 4 in each wavelength range respectively. For example, FIGS. 4A to 4B illustrate the configuration of the semiconductor lasers 4G, 4B such that a mass of the four diverging lights (G) in a green light range and a mass of the two diverging lights (B) in a blue light range are placed, and then the light which exits from the laser module 6 enters the optical multiplexing component 10 without being converged.

In order to obtain a uniform light intensity distribution at the exist surface of the optical multiplexing component 10, the light is made uniform with being reflected by the inner surfaces of the optical multiplexing component 10 during propagation through the optical multiplexing component 10. In this case, since the diverging angle $\theta_x$ in the X axis (short axis) direction is small, the optical multiplexing component 10 needs to have a length corresponding to such small diverging angle $\theta_x$. Therefore, the optical multiplexing component 10 needs to have a long total length.

In order to verify the above, an optical simulation is performed according to the following condition.

The diverging angles of $\theta_x$ and $\theta_y$ are 5 degrees (half angle) and 25 degrees (half angle) respectively, and a distance of the luminance points of the adjacent semiconductor lasers is 0.9 mm. The optical multiplexing component 10 is a solid rod integrator made of synthetic quartz, which has a section of 6 mm×6 mm, and a total length of 50 mm. When the simulation is performed according to this condition, there is obtained a light intensity distribution in the X axis (short axis) direction of the light in a blue light range just after exiting from the exit surface of the optical multiplexing component (rod integrator) as illustrated in FIG. 4B. Thus, the light intensity distribution is shifted to one direction according to the location of the semiconductor lasers 4B which emits the light in a blue range. If the total length of the optical multiplexing component (rod integrator) is made longer, the shifted distribution is made smaller. However, the total length of 170 mm or more is necessary for obtaining the uniform light intensity distribution.

On the other hand, a light intensity distribution in a blue light range in the Y axis (ling axis) direction just after exiting from the exit surface of the optical multiplexing component (rod integrator) shows a uniform distribution. This is because the diverging angle $\theta_y$ in the Y axis (long axis) direction is so large that the number of reflection (to the inner surface) is large even in the optical multiplexing component having a rather short total length, and thereby achieving the uniform light density distribution easily. This reason is the same as the case of a light emitting diode which has large diverging angles in all directions without relating to the arrangement.

(Description of Arrangement of Semiconductor Lasers According to First Embodiment)

Next, with referring to FIGS. 5A to 5C, an arrangement of semiconductor lasers according to a first embodiment of the present invention is described. FIGS. 5A to 5C illustrate figures showing an example of the arrangement of the semiconductor lasers according to the first embodiment of the present invention and a light intensity distribution of the light just after exiting from the optical multiplexing component according to the example. At first, an optical simulation is performed by changing the arrangement of the four diverging lights (G) in a green light range and the two diverging lights (B) in a blue light range in the X axis (short axis). In each of FIG. 5A to 5C, the arrangement of the semiconductor lasers 4G, 4B is illustrated in the upper side, and the light intensity distribution of the light in a blue light range in the X axis (short axis) direction just after exiting from the exit surface of the optical multiplexing component (rod integrator) is illustrated in the lower side.

The parameters of the arrangement of the semiconductor laser are the same as those as shown in FIGS. 4A to 4B as follows:

the diverging angles $\theta_x$: 5 degrees (half angle)
the diverging angles $\theta_y$: 25 degrees (half angle)
the distance of the luminance points of the adjacent semiconductor lasers: 0.9 mm
the optical multiplexing component 10: the solid rod integrator made of synthetic quartz, the section of 6 mm×6 mm and the total length of 50 mm.

In the example as illustrated in FIG. 5A, the semiconductor lasers 4G in a green light wavelength range and the semiconductor lasers 4B in a blue light wavelength range are placed in linear symmetry in the X axis (short axis) direction at the exit surface of the laser module. The arrangement in linear symmetry can be reworded to the arrangement in mirror symmetry. Specifically, the semiconductor lasers are placed in the order of B→G→G from the center axis in the both sides of the center axis (the mirror surface in the case of mirror symmetry). A light intensity distribution of the light in a blue light range in the X axis (short axis) direction just after exiting from the exit surface of the optical multiplexing component (rod integrator) is illustrated in the graph in the lower part of FIG. 5A. As shown in the graph, if the diverging lights in a blue light range are placed at the center side, the light intensity distribution of the light in a blue light range just after exiting from the exit surface of the optical multiplexing component (rod integrator) has a shape shifting to the center. While it cannot be said that it is uniform in total, the light intensity of the light in a blue light range at the both end sides of the optical multiplexing component (rod integrator) in its width direction becomes almost same.

In the example of FIG. 5B, the semiconductor lasers 4G in a green light range and the semiconductor lasers 4B in a blue light range are placed in linear symmetry in the X axis (short axis) direction at the exit surface of the laser module. Specifically, the semiconductor lasers are placed in the order of G→G→B from the center axis at the both sides of the center axis. A light intensity distribution in the X axis (short axis) direction of the light in a blue light range just after exiting from the exit surface of the optical multiplexing component (rod integrator) is illustrated in the graph in the lower part of FIG. 5B. As shown in the graph, if the diverging lights in a blue light range are placed at the both ends, the light intensity distribution of the light in a blue light range just after exiting from the exit surface of the optical multiplexing component (rod integrator) has a shape shifting to the both sides. While it cannot be said that it is uniform in total, the light intensity of the light in a blue light range at the both end sides of the optical multiplexing component (rod integrator) in its width direction becomes almost same.

In the example of FIG. 5C, the semiconductor lasers 4G in a green light range and the semiconductor lasers 4B in a blue light range are placed in linear symmetry in the X axis (short axis) direction at the exit surface of the laser module (First linear symmetry). Specifically, the semiconductor lasers are placed in the order of G→B→G from the center axis at the both sides of the center axis. Further, in the example of FIG. 5C, in the group of the semiconductor lasers (G, B, G) divided by the above mentioned center axis of the linear symmetry, the semiconductor lasers 4G in a green light range and the semiconductor lasers 4B in a blue light range are placed in linear symmetry in the X axis (short axis) direction (Second linear symmetry). Specifically, the center axis of the linear symmetry passes through the semiconductor lasers 4B in a blue light range, and the semiconductor lasers 4G in a green light range are placed at the both sides of the center axis.

A light intensity distribution in the X axis (short axis) direction of the light in a blue light range just after exiting from the exit surface of the optical multiplexing component (rod integrator) is illustrated in the graph in the lower part of FIG. 5C. As shown in the graph, if the first and second linear symmetry that the diverging lights in a blue light range are placed at the middle location is realized, the light intensity distribution of the light in a blue light range just after exiting from the exit surface of the optical multiplexing component (rod integrator) has a shape to be uniform in total.

Accordingly, since the light intensity distribution is uniform in total in the case of FIG. 5C, it is clear that the total length of the optical multiplexing component (rod integrator) can be made shorter. While it cannot be said that it is uniform in total in the case of FIGS. 5A to 5C, the light intensity at the both end sides of the optical multiplexing component (rod integrator) in its width direction becomes almost same. Even in this case, the total length of the optical multiplexing component (rod integrator) can be made shorter than that of the ordinary arrangement. This reason is described below with referring to FIG. 6.

Figure 6:
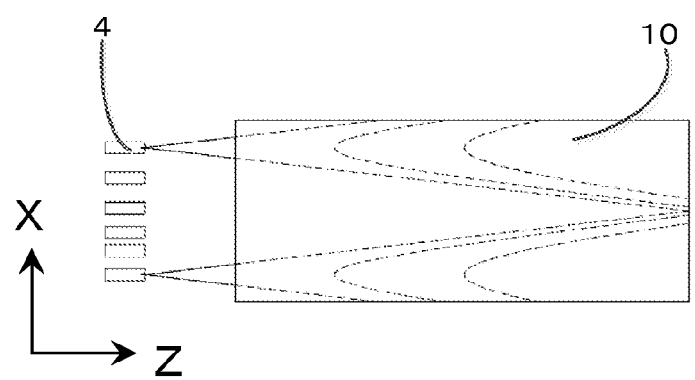
FIG. 6 illustrates a schematic diagram for describing the image that lights which exit from the semiconductor lasers located in the both ends of the optical multiplexing component in the width direction thereof are propagated in the optical multiplexing component.

FIG. 6 illustrates a plan view seeing the semiconductor lasers 4 and the optical multiplexing component 10 from the top surface side thereof, and it schematically shows the image where lights which exit from the semiconductor lasers 4 located in the both ends of the laser module in the X axis direction thereof are propagated in the optical multiplexing component 10.

The wavelength range of the semiconductor lasers 4 located at the both ends is identical. Therefore, if lights which exit the semiconductor lasers 4 located at the both ends are reflected 1/2 times or more in the optical multiplexing component 10, the light intensity distribution becomes uniform at the exit surface of the optical multiplexing component 10.

In the case that the only first linear symmetry is realized as illustrated in FIGS. 5A to 5B, the total length of the optical multiplexing component 10 cannot be reduced to the level as illustrated in FIG. 5C where both the first linear symmetry and the second linear symmetry are realized. However, the total length of the optical multiplexing component 10 can be reduced in comparison with the case of the ordinary arrangement of the semiconductor lasers as illustrated in FIGS. 4A to 4B.

(Description of Dimension of Optical Multiplexing Component 10)

As mentioned above, if a first linear symmetry where a first semiconductor laser(s) and a second semiconductor laser(s) which emit lights of different wavelengths respectively (for example, a green light range and a blue light range) are placed in linear symmetry in the X axis (short axis) direction is realized (refer to FIGS. 5A to 5C), the exist light having the uniform light intensity distribution can be obtained by using the optical multiplexing component 10 having a short total length in comparison with the ordinary arrangement. Further, in the group of the semiconductor lasers divided by the center axis of the first linear symmetry, if a second linear symmetry where the first semiconductor laser(s) and the second semiconductor laser(s) which emit lights of different wavelengths respectively (for example, a green light range and a blue light range) are placed in linear symmetry in the X axis (short axis) direction is realized (refer to FIG. 5C), the existing light having the uniform light intensity distribution can be obtained by using the optical multiplexing component 10 having a shorter total length.

Figure 7A:
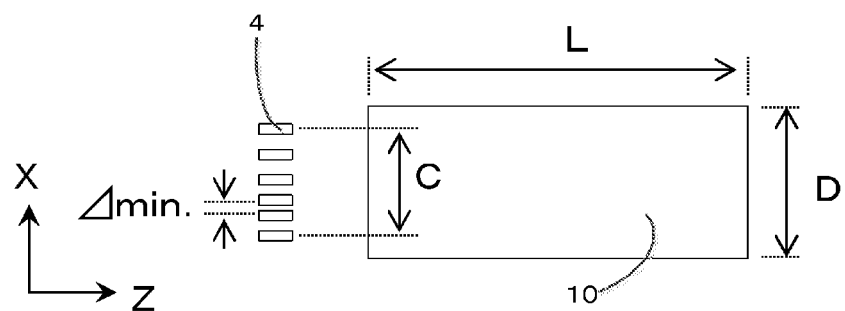
FIGS. 7A to 7B illustrate schematic plan views for describing the required dimensions or the like of the optical multiplexing component.
Figure 7B:
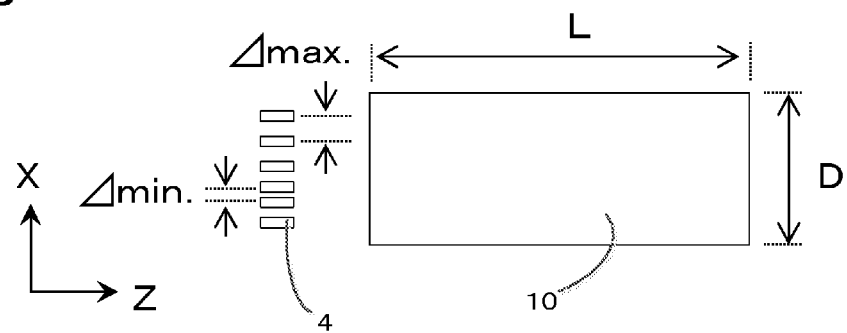

However, even in the case that arrangement of wavelength range is identical as illustrated in FIGS. 5A to 5C, the light intensity distribution of the light just after exiting from the optical multiplexing component 10 may become non-uniform according to the luminance point length of the semiconductor lasers 4 and the sectional size of the optical multiplexing component 10. Therefore, there is a case that the total length of the optical multiplexing component 10 cannot be reduced. This point is described with referring to FIGS. 7A to 7B. FIGS. 7A to 7B illustrate schematic plan views for describing the required dimension or the like of the optical multiplexing component 10.

When an optical simulation is performed, it is found out that a light intensity distribution of the light just after exiting from the optical multiplexing component 10 can become uniform together with reducing the number of reflection in the optical multiplexing component 10 as illustrated in FIGS. 7A to 7B according to the condition that the following formulas (1) and (2) are realized:

$$D < C + 4 \times \Delta min. \qquad \text{the formula (1)}$$

$$\Delta max. < 3 \times \Delta min. \qquad \text{the formula (2)}$$

on the condition that:
(a) in the adjacent luminance point lengths of the semiconductor lasers in the X axis (short axis) direction, a maximum length and a minimum length are $\Delta min.$ and $\Delta max.$,
(b) the total luminance point length in the X axis (short axis) direction is C, and
(c) the width of the optical multiplexing component in the X axis (short axis) direction is D.

Further, if a refractive index is n, and a diverging angle in the X axis (short axis) direction is $\theta_x$, NA value can be described as:

$$NA = \sin(\theta_x).$$

And a theoretically required length that a light is reflected once in the optical multiplexing component 10 can be described as:

$$D\sqrt{(n^2 - NA^2)/NA^2}$$

As mentioned above, while the reflection of 1/2 times should be required as a minimum in order to obtain a uniform light intensity distribution, taking into account the deviation from theoretical values in actual light transmission, the reflection of one time (once) is preferable, and the reflection of 3/2 times is more preferable.

Therefore, with corresponding to the case that a light having the diverging angle of $\theta_x$ is reflected from 1/2 times to 3/2 times in the optical multiplexing component 10, the total length of the optical multiplexing component 10 L may be limited to the following formula (3):
the $$\frac{1}{2}D\sqrt{\frac{n^2-NA^2}{NA^2}} < L < \frac{3}{2}D\sqrt{\frac{n^2-NA^2}{NA^2}}. \qquad \text{formula (3)}$$

If the optical multiplexing component 10 is a solid rod integrator, the optical multiplexing component 10 can be formed by synthetic quartz or BK-7. If the optical multiplexing component 10 is a hollow light pipe, a light is propagated in the air. Refractive indexes of the synthetic quartz, the BK-7 and the air are around 1.46, around 1.52 and 1.0 respectively. If the diverging angle $\theta_x$ of the light emitted from the semiconductor laser 4 is 4 degrees or more, the total length L of the optical multiplexing component 10 can be 22 times or less of the width D of the optical multiplexing component 10 in the X axis (short axis) direction.

Thus, the following formula (4) can be realized:

$$L < 22 \times D. \qquad \text{the formula (4):}$$

By satisfying the above mentioned conditions as shown in the formula (1) to (4), a uniform light intensity distribution can surely be obtained at the exit surface of the optical multiplexing component 10 with using the optical multiplexing component 10 having a short total length.

(Further Description of Arrangement of Semiconductor Lasers According to First Embodiment)

The arrangement of the semiconductor lasers of different wavelengths (wavelength range arrangement) according to the first embodiment of the present invention is further described with referring to FIG. 8 to FIG. 11, based on the knowledge for obtaining the uniform light intensity distribution at the exit surface of the optical multiplexing component 10 in the optical simulation on the condition as illustrated in FIG. 6 and FIGS. 7A to 7B.

Figure 8A:
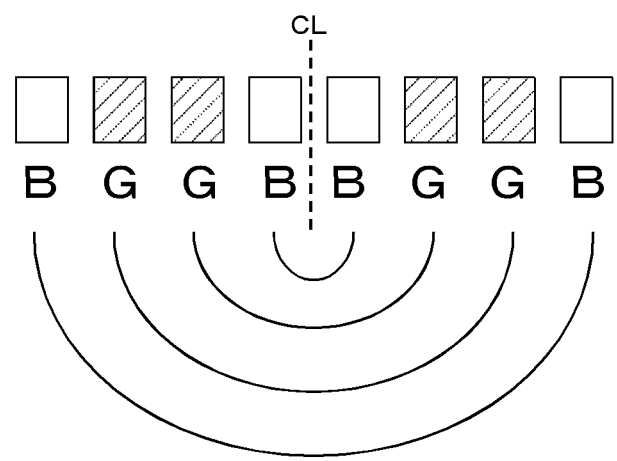
FIG. 8A illustrates a schematic diagram for describing an example of the arrangement of the semiconductor lasers according to the first embodiment of the present invention.
Figure 8B:
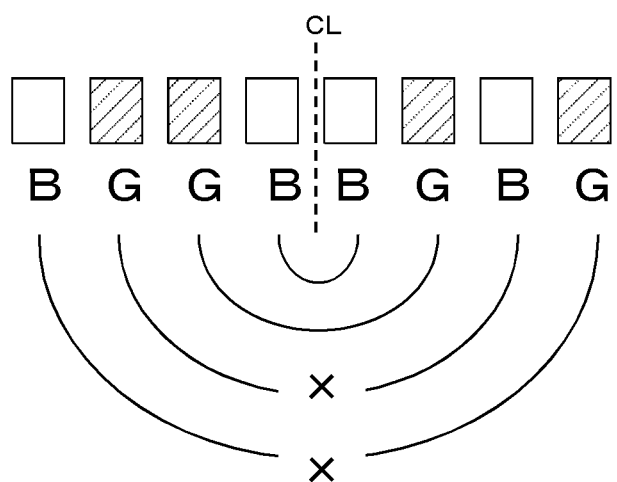
FIG. 8B illustrates a schematic diagram for describing the comparative example thereof.

FIGS. 8A to 8B illustrate schematic diagrams for describing the wavelength range arrangement configured such that four semiconductor lasers 4G in a green light range and four semiconductor lasers 4B in a blue light range are aligned in one line.

As illustrated in FIG. 8A, if the semiconductor lasers 4G and the semiconductor lasers 4B are placed in linear symmetry to the center axis CL in the X axis (short axis), the exit surface of the optical multiplexing component 10 has a uniform light intensity distribution. Thus, in FIG. 8A, the wavelength range arrangement in each of the groups of the semiconductor lasers divided by the center axis CL has the order of B→G→G→B from the center axis side.

In another description, it can be said that the semiconductor lasers 4G and the semiconductor lasers 4B are placed in mirror symmetry in the X axis (short axis) direction. Further, it can be said that if the group of the semiconductor lasers is divided by the center of the line CL into two groups such that each group has the same number of the semiconductor lasers, the order of the wavelength range of divided two groups is opposite to each other.

On the other hand, in the wavelength range arrangement of FIG. 8B, the semiconductor lasers 4G and the semiconductor lasers 4B are not placed in linear symmetry (mirror symmetry) in the X axis (short axis) direction. In other words, if the group of the semiconductor lasers is divided by the center of the line CL into two groups such that each group has the same number of the semiconductor lasers, the wavelength range arrangement in one of the two groups has the order of B→G→G→B from the center of the line, and the wavelength range arrangement in the other of the two groups has the order of B→G→B→G from the center of the line. Thus, the order of the wavelength range of divided two groups is not opposite to each other.

In the case of FIG. 8B, a uniform light intensity distribution cannot be obtained at the exit surface of the optical multiplexing component 10 under the condition as illustrated in FIG. 6 and FIGS. 7A to 7B. Therefore, the total length of the optical multiplexing component 10 needs to be made longer in order to obtain a uniform light intensity distribution.

Figure 9:
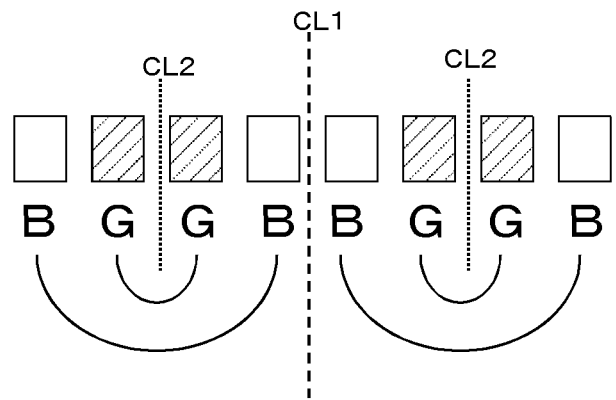
FIG. 9 illustrates a schematic diagram for describing an example of the arrangement of the semiconductor lasers according to the first embodiment of the present invention.

Further, in the embodiments as illustrated in FIG. 9, the semiconductor lasers 4G and the semiconductor lasers 4B are placed in linear symmetry (mirror symmetry) to the center axis CL1 in the X axis (short axis) direction (First linear symmetry), and in each group of the semiconductor lasers divided by the center axis CL1, the semiconductor lasers 4G and the semiconductor lasers 4B are placed in linear symmetry (mirror symmetry) to the center axis CL2 in the X axis (short axis) direction (Second linear symmetry).

In another description, in the group of the semiconductor lasers divided by the center axis CL1, if the group of the semiconductor lasers is further divided by the center axis CL2 into two groups such that each group has the same number of the semiconductor lasers, the order of the wavelength range of further divided two groups is opposite to each other. Thus, in FIG. 9, the wavelength range arrangement in each of the two groups of the semiconductor lasers divided by the center axis CL2 has the order of G→B from the center axis CL2.

In this arrangement, as illustrated in FIG. 5C, a uniform light intensity distribution can be obtained at the exit surface of the optical multiplexing component 10 by using the optical multiplexing component 10 having a shorter total length.

Next, the wavelength range arrangement to be suitable for the case that the odd number of the semiconductor lasers 4 are aligned in one line is described.

Figure 10A:
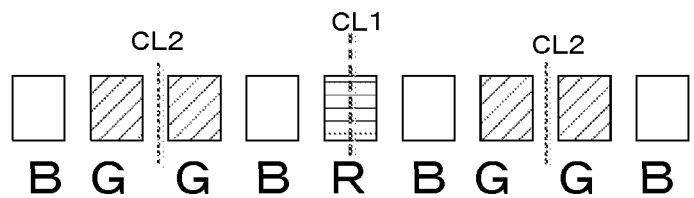
FIGS. 10A to 10B illustrate schematic diagrams for describing examples of the arrangement of the semiconductor lasers according to the first embodiment of the present invention.

In FIG. 10A, it illustrates an arrangement where a semiconductor laser 4R in a red light range, four semiconductor lasers 4G in a green wavelength range and four semiconductor lasers 4B in a blue wavelength range are aligned in one line.

In this case, the center axis CL1 of the first linear symmetry passes through a center of the semiconductor laser 4R in a red light range. Even in this case, the semiconductor lasers 4G and the semiconductor lasers 4B are placed in linear symmetry (mirror symmetry) to the center axis CL1 in the X axis (short axis) direction, and therefore the first linear symmetry is realized. Further, it can be said that the semiconductor laser 4R itself is placed in linear symmetry (mirror symmetry) to the center axis CL1.

In the case that the group of the semiconductor lasers is divided by the center axis CL1 of the first linear symmetry, and the semiconductor laser 4R exists at the location of the center axis CL1, the semiconductor lasers 4G and the semiconductor lasers 4B are placed in liner symmetry (mirror symmetry) to the center axis CL2 in the X axis (short axis) direction in each of the two groups if the semiconductor laser 4R is excluded. Therefore, the second linear symmetry is also realized.

Accordingly, in this arrangement, as illustrated in FIG. 5C, a uniform light intensity distribution can be obtained at the exit surface of the optical multiplexing component 10 by using the optical multiplexing component 10 having a shorter total length.

Figure 10B:
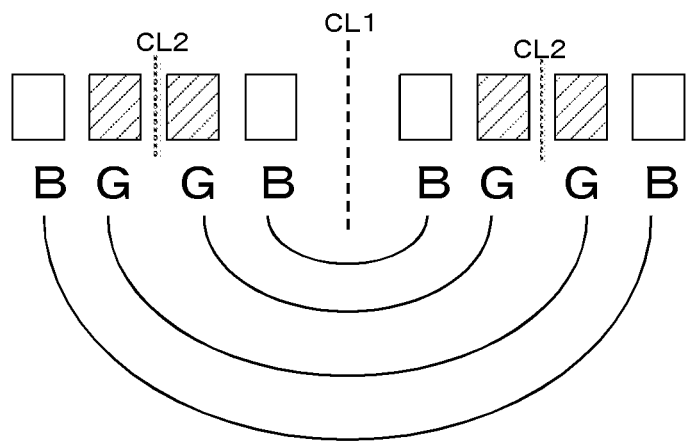

In another description, as illustrated in FIG. 10B, if the group of the semiconductor lasers is divided by the center axis CL1 into two groups such that each group has the same number of the semiconductor lasers with excluding the semiconductor laser 4R, the order of the wavelength range of divided two groups is opposite to each other.

Thus, if the semiconductor laser 4R located at the center is excluded as illustrated in FIG. 10B, the wavelength range arrangement in each of the two groups of the semiconductor lasers divided by the center axis CL1 has the order of B→G→G→B from the center axis CL1.

Further, in the group of the semiconductor lasers divided by the center axis CL1, if the group of the semiconductor lasers is further divided by the center axis CL2 into two groups such that each group has the same number of the semiconductor lasers, the order of the wavelength range of further divided two groups is opposite to each other. Thus, in FIG. 10B, the wavelength range arrangement in each of the two groups of the semiconductor lasers divided by the center axis CL2 has the order of G→B from the center axis CL2.

In such case, a uniform light intensity distribution can be obtained at the exit surface of the optical multiplexing component 10 by using the optical multiplexing component 10 having a shorter total length.

FIGS. 11A to 11D exemplify wavelength range arrangements having two lines where the semiconductor lasers 4 are aligned in the X axis (short axis) direction. In this case, the conditions as illustrated in FIG. 6 to FIG. 10 may be realized in each line. As illustrated in the second line (lower line) in FIG. 11C, in the case that one line is formed by the same semiconductor lasers, it is clear that a uniform light intensity distribution can be obtained at the exit surface of the optical multiplexing component 10 by using the optical multiplexing component 10 having a shorter total length. It is also clear that linear symmetry (mirror symmetry) is realized.

Figure 11A:
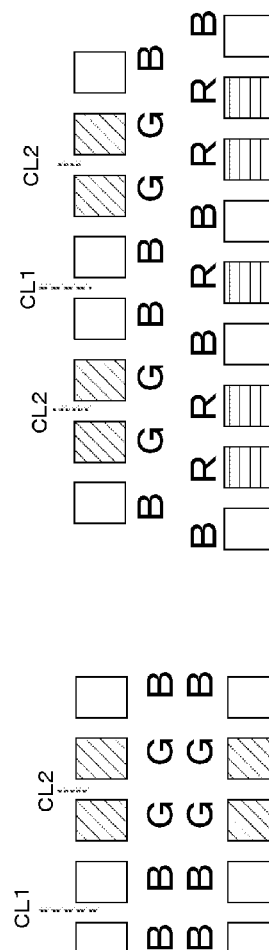
FIGS. 11A to 11D illustrate schematic diagrams for describing examples of the arrangement of the semiconductor lasers according to the first embodiment of the present invention.
Figure 11B:
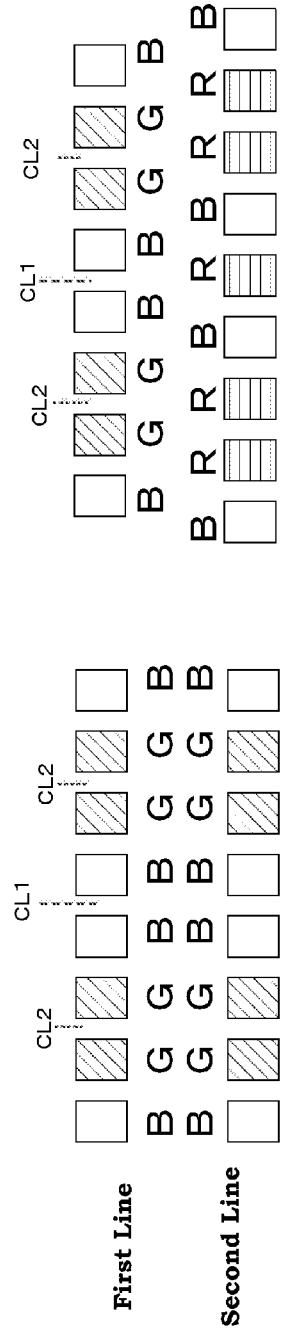
Figure 11C:
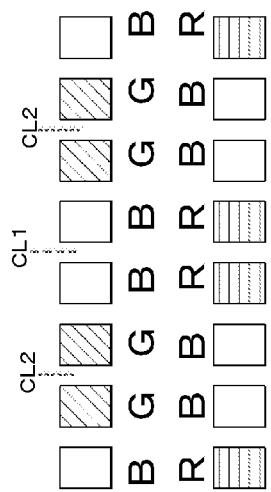

As illustrated in FIG. 11A, two lines may have the same wavelength range arrangement, and as illustrated in FIG. 11B, two lines may have the different wavelength range arrangement. As illustrated in FIG. 11C, one line can have the same semiconductor lasers. According to the arrangement of FIG. 11C, a light source apparatus which can output a white light with high performance can be provided.

Figure 11D:
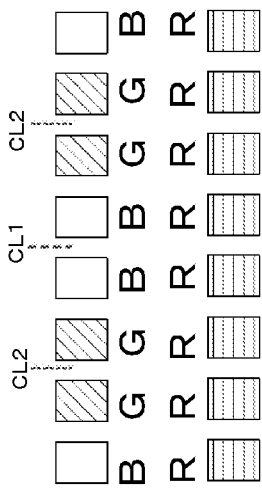

Further, as illustrated in FIG. 11D, the number of the semiconductor lasers 4 in one line may be an even number and the number of the semiconductor lasers 4 in the other line may be an odd number.

In any cases, a uniform light intensity distribution can be obtained at the exit surface of the optical multiplexing component 10 by using the optical multiplexing component 10 having a shorter total length.

Accordingly, in the arrangement of the semiconductor lasers according to the first embodiment of the present invention, the light source apparatus 2 comprises the laser module 6 where the first semiconductor laser(s) (for example, semiconductor laser(s) 4G) and the second semiconductor laser(s) (for example, semiconductor laser(s) 4B) which emits a light of the wavelength different from that of the first semiconductor laser(s) are placed such that the emitting direction of each semiconductor laser is approximately the same and a short axis direction of a far field pattern of each semiconductor laser is approximately the same, and the optical multiplexing component 10 which a light which exits from said laser module enters without being converged. At the exit surface of the laser module 6, the first semiconductor laser(s) and the second semiconductor laser(s) are placed in linear symmetry (mirror symmetry) in the X axis (short axis) direction (First linear symmetry (mirror symmetry)).

According to this configuration, a uniform light intensity distribution can be obtained at the exit surface of the optical multiplexing component 10 by using the optical multiplexing component 10 having a short total length.

Further, in each group of the semiconductor lasers divided by the center axis of the linear symmetry (mirror symmetry), on the condition that if the semiconductor laser exists at the location of the center axis, such semiconductor laser is excluded from the group, the first semiconductor laser(s) and the second semiconductor laser(s) are placed in linear symmetry (mirror symmetry) in the X axis (short axis) direction (Second linear symmetry (mirror symmetry)).

In the case that both the first linear symmetry and the second linear symmetry are satisfied, a more uniform light intensity distribution can be obtained at the exit surface of the optical multiplexing component 10 in comparison with the case that only the first linear symmetry is satisfied.

(Description of Arrangement of Semiconductor Lasers According to Second Embodiment)

Next, the arrangement of the semiconductor lasers of different wavelength (wavelength range arrangement) according to a second embodiment of the present invention is described with referring to FIGS. 12A to 12C and FIGS. 13A to 13C, based on the knowledge for obtaining a uniform light intensity distribution at the exit surface of the optical multiplexing component 10 in the optical simulation.

In the second embodiment, while the semiconductor lasers of different wavelengths are not placed in linear symmetry (mirror symmetry) in the X axis (short axis) in one line, the semiconductor lasers are placed in linear symmetry (mirror symmetry) in the X axis (short axis) with combining two lines.

Figure 12A:
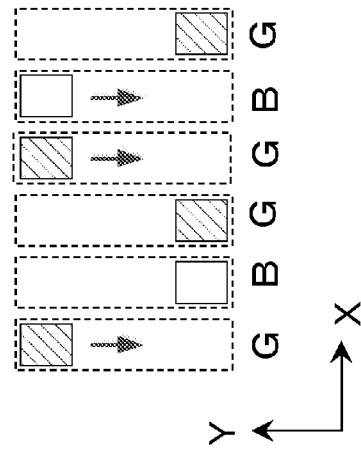
FIGS. 12A to 12C illustrate schematic diagrams for describing an example of the arrangement of the semiconductor lasers according to the second embodiment of the present invention and a light intensity distribution of the light just after exiting from the optical multiplexing component according to the example.

In FIG. 12A, there is described an example using semiconductor lasers 4G in a green light range and semiconductor lasers 4B in a blue light range. In FIG. 12A, while each line has a space enough to place six semiconductor lasers, only 3 semiconductor lasers 4 are placed in each of the lines. Further, if the semiconductor laser 4 exists in one line, no semiconductor laser exists at the corresponding location of the other line.

Figure 12B:
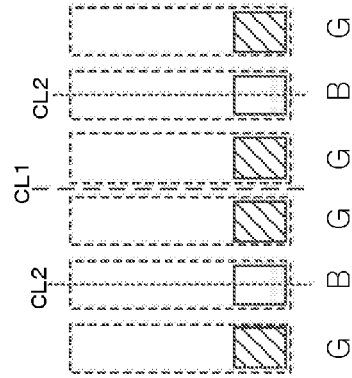
Figure 12C:
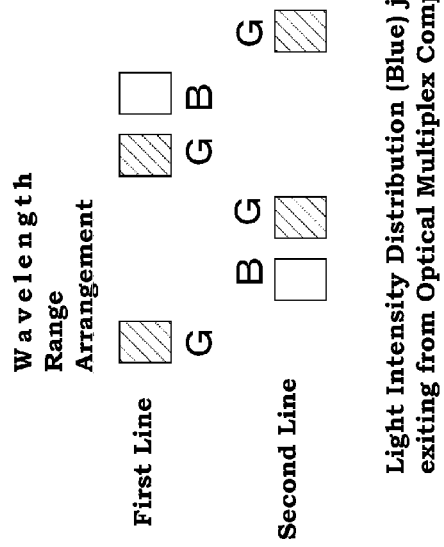

In this case, if semiconductor lasers would be aligned in the same line of other semiconductors by moving in the direction vertical to the lines, in other words, as indicated by the arrow in FIG. 12B, if semiconductor lasers in the first line (upper line) moves in the direction vertical to the line, such semiconductor lasers are aligned in the second line (lower line) as illustrated in FIG. 12C. In this case, the semiconductor lasers 4G and the semiconductor lasers 4B are placed in liner symmetry (mirror symmetry) to the center axis CL1 in the X axis (short axis) direction (First linear symmetry), and further, in each of the groups of the semiconductor lasers divided by the center axis CL1 of the linear symmetry, the semiconductor lasers 4G and the semiconductor lasers 4B are placed in linear symmetry to the center axis CL2 of the linear symmetry in the X axis (short axis) direction (Second Linear Symmetry).

In this case, in general, a diverging angle $\theta_Y$ in the Y axis direction is larger than a diverging angle $\theta_x$ in the X axis direction. Therefore, even in the laser module 6 configured by one line of the semiconductor lasers as illustrated in FIG. 2A, and even in the laser module 6 configured by two lines of the semiconductor lasers as illustrated in FIG. 2B, a uniform light intensity distribution can easily be obtained in the Y axis (long axis) direction. Thus, in the laser module configured by two lines of the semiconductor lasers, as far as two or more semiconductors do not exist at the same location in the X axis (short axis) direction, the wavelength range arrangement can be considered as illustrated in FIG. 12C without identifying each line as illustrated in FIG. 12B. Therefore, if the order of the wavelength (wavelength range arrangement) is considered adequately, a uniform light intensity distribution in the X axis (shirt axis) direction can be obtained at the exit surface of the optical multiplexing component 10.

A light intensity distribution of the light in a blue light range in the X axis (short axis) direction just after exiting from the exit surface of the optical multiplexing component 10 in the arrangement of semiconductor lasers 4 as shown in FIG. 12A is illustrated in the graph in the lower part of FIG. 12A. As shown in the graph, the light intensity distribution of the light in a blue light range just after exiting from the exit surface of the optical multiplexing component 10 becomes uniform in total even in the case configured by the two lines.

This can be applied to the laser module configured by three lines or more according to the diverging angle $\theta_Y$ in the Y axis direction relating to the light just after exiting from the exit surface of the optical multiplexing component 10.

Next, with referring to FIGS. 13A to 13C, an example of the arrangement of the semiconductor lasers according to the second embodiment of the present invention is described. FIGS. 13A to 13C illustrate schematic diagrams for describing examples of the arrangement of the semiconductor lasers according to the second embodiment of the present invention. In FIG. 13A, it schematically describes a wavelength range arrangement having two lines configured by four semiconductor lasers 4G in a green light range and four semiconductor lasers 4B in a blue light range.

As illustrated in FIG. 13A, if only one semiconductor laser 4 exists in the direction vertical to the lines, and such semiconductor laser 4 would be aligned in the same line of other semiconductors by moving in the direction vertical to the lines, the semiconductor lasers 4G in a green light range and the semiconductor lasers 4B in a blue light range are placed in linear symmetry (mirror symmetry) to the center axis CL1 in the X axis (short axis) direction (First linear symmetry). Accordingly, a uniform light intensity distribution can be obtained at the exit surface of the optical multiplexing component 10 by using the optical multiplexing component 10 having a short total length. Further, in each group of the semiconductor lasers divided by the center axis CL 1 of the linear symmetry, the semiconductor lasers 4G and the semiconductor lasers 4B are placed in linear symmetry (mirror symmetry) to the center axis CL2 in the X axis (short axis) direction (Second linear symmetry). Accordingly, a uniform light intensity distribution can be obtained at the exit surface of the optical multiplexing component 10 by using the optical multiplexing component 10 having a shorter total length.

In another description, in the laser module 6 configured by two lines of the semiconductor lasers 4, if the group of the semiconductor lasers is divided by the center axis CL1 into two groups such that each group has the same number of the semiconductor lasers, the order of the wavelength range of further divided two groups is opposite to each other. In this case, a uniform light intensity distribution can be obtained at the exit surface of the optical multiplexing component 10 by using the optical multiplexing component 10 having a short total length. Thus, in (a) of FIG. 13, the wavelength range arrangement in each of the two groups of the semiconductor lasers divided by the center axis CL1 has the order of B→G→G→B from the center axis CL1.

Further, in the group of the semiconductor lasers divided by the center axis CL1, if the group of the semiconductor lasers is further divided by the center axis CL2 into two groups such that each group has the same number of the semiconductor lasers, the order of the wavelength range of further divided two groups is opposite to each other. In this case, a uniform light intensity distribution can be obtained at the exit surface of the optical multiplexing component 10 by using the optical multiplexing component 10 having a shorter total length. Thus, in FIG. 13A, the wavelength range arrangement in each of the two groups of the semiconductor lasers divided by the center axis CL2 has the order of G→B from the center axis CL2.

If the group of the semiconductor lasers 4 divided by the center axis CL1 has the odd numbers of the semiconductor lasers 4, it can be said that the semiconductor laser which exists at the location of the center axis CL2 is placed in linear symmetric to the center axis CL2. Therefore, if the semiconductor lasers 4G and semiconductor lasers 4B are placed in linear symmetry (mirror symmetry) to the center axis CL2 in the X axis (short axis) direction (Second linear symmetry), a uniform light intensity distribution can be obtained at the exit surface of the optical multiplexing component 10 by using the optical multiplexing component 10 having a shorter total length.

In FIG. 13B, it schematically describes a wavelength range arrangement of two lines configured by one semiconductor laser 4R in a red light range, four semiconductor lasers 4G in a green light range, and four semiconductor lasers 4B in a blue light range.

In this case, if the semiconductor laser 4 would be aligned in the one line by moving it in the direction vertical to the lines, the group is configured as having the odd number of the semiconductor lasers 4. The center axis CL1 passes through the center line of the semiconductor laser 4R which is located at the center of the line (the semiconductor laser 4R is also placed in linear symmetry (mirror symmetry)), and the semiconductor lasers 4G and the semiconductor lasers 4G are placed in linear symmetry (mirror symmetry) to the center axis CL1 in the X axis (short axis) direction (First linear symmetry). Accordingly, a uniform light intensity distribution can be obtained at the exit surface of the optical multiplexing component 10 by using the optical multiplexing component 10 having a short total length. Further, since the semiconductor laser 4R exists at the location of the center axis CL1, in the group of the semiconductors 4 excluding the semiconductor laser 4R as illustrated in FIG. 13B, the semiconductor lasers 4G and the semiconductor lasers 4B are placed in linear symmetry (mirror symmetry) to the center axis CL2 in the X axis (short axis) direction (Second linear symmetry). Accordingly, a uniform light intensity distribution can be obtained at the exit surface of the optical multiplexing component 10 by using the optical multiplexing component 10 having a shorter total length.

Even in the case that the group of the semiconductor lasers 4 divided by the center axis CL1 has the odd numbers of the semiconductor lasers 4, the semiconductor laser 4 which is located at the location of the center axis CL2 is placed in linear symmetry (mirror symmetry) to the center axis CL2. Therefore, in the group of the semiconductor lasers 4 excluding such semiconductor laser 4, if the semiconductor lasers 4G and the semiconductor lasers 4G are placed in linear symmetry (mirror symmetry) to the center axis CL2 in the X axis (short axis) direction (Second linear symmetry), a uniform light intensity distribution can be obtained at the exit surface of the optical multiplexing component 10 by using the optical multiplexing component 10 having a shorter total length.

In another description, as illustrated in FIG. 13C, in the case that the semiconductor laser 4R which is located at the center of the group of the semiconductor lasers is excluded, and the group of the semiconductor lasers is divided by the center axis CL2 into two groups such that each group has the same number of the semiconductor lasers, if the order of the wavelength range of divided two groups is opposite to each other, the light intensity distribution at the exit surface of the optical multiplexing component 10 becomes uniform. Thus, considering the case of FIG. 13C that the semiconductor laser R which is located at the center of the group is excluded, the wavelength range arrangement in each of the two groups of the semiconductor lasers divided by the center axis CL 1 has the order of B→G→G→B from the center axis CL1. At this moment, the semiconductor laser 4G which is located in the center is also placed in liner symmetry to the center axis CL1.

Further, in the divided groups of the semiconductor lasers, if the group of the semiconductor lasers is further divided by the center axis CL2 into two groups such that each group has the same number of the semiconductor lasers, if the order of the wavelength range of further divided two groups is opposite to each other, a uniform light intensity distribution can be obtained at the exit surface of the optical multiplexing component 10 by using the optical multiplexing component 10 having a further short total length.

As mentioned above, in the arrangement of the semiconductor lasers according to the second embodiment of the present invention, the light source apparatus 2 comprises the laser module 6 where the first semiconductor laser(s) (for example, the semiconductor lasers 4G) and the second semiconductor laser(s) which emits a light of the wavelength different from that of the first semiconductor laser(s) (for example, the semiconductor lasers 4B) are placed such that the emitting direction of each semiconductor laser is approximately the same and the X axis (short axis) direction of each semiconductor laser is approximately the same, and the optical multiplexing component 10 which a light which exits from the laser module 6 enters without being converged. In the light source apparatus 2, the plurality of lines (for example, 2 lines) where the first semiconductor laser(s) and the second semiconductor laser(s) are aligned in the X axis (short axis) direction are placed, if only one semiconductor laser exists in the direction vertical to the lines, and such one semiconductor would be aligned in the same line of other semiconductor(s) by moving in the direction vertical to the lines, the first semiconductor laser(s) and the second semiconductor laser(s) are placed in linear symmetry (mirror symmetry) in the short axis direction.

Since a diverging angle $\theta_Y$ in the Y axis direction is larger than a diverging angle $\theta_x$ in the X axis direction, a uniform light intensity distribution can be obtained at the exist surface of the optical multiplexing component 10, even in the laser module 6 configured by a plurality of lines of the semiconductor lasers.

Further, in the case that the semiconductor lasers are aligned in one line, in each group of the semiconductor lasers divided by the center axis CL 1 of the linear symmetry, if the semiconductor laser exists at the location of the center axis CL1, in the group of the semiconductor lasers which excludes such semiconductor laser, the first semiconductor laser(s) and the second semiconductor laser(s) are placed in linear symmetry (mirror symmetry) to the center axis CL2 in the X (short axis) direction (Second linear symmetry).

Even in the case having a plurality of lines of the semiconductor lasers, if both the first linear symmetry and the second linear symmetry are satisfied, a more uniform light intensity distribution can be obtained at the exit surface of the optical multiplexing component 10 in comparison with the case that only the first linear symmetry is satisfied.

(Description of Projector)

Figure 14:
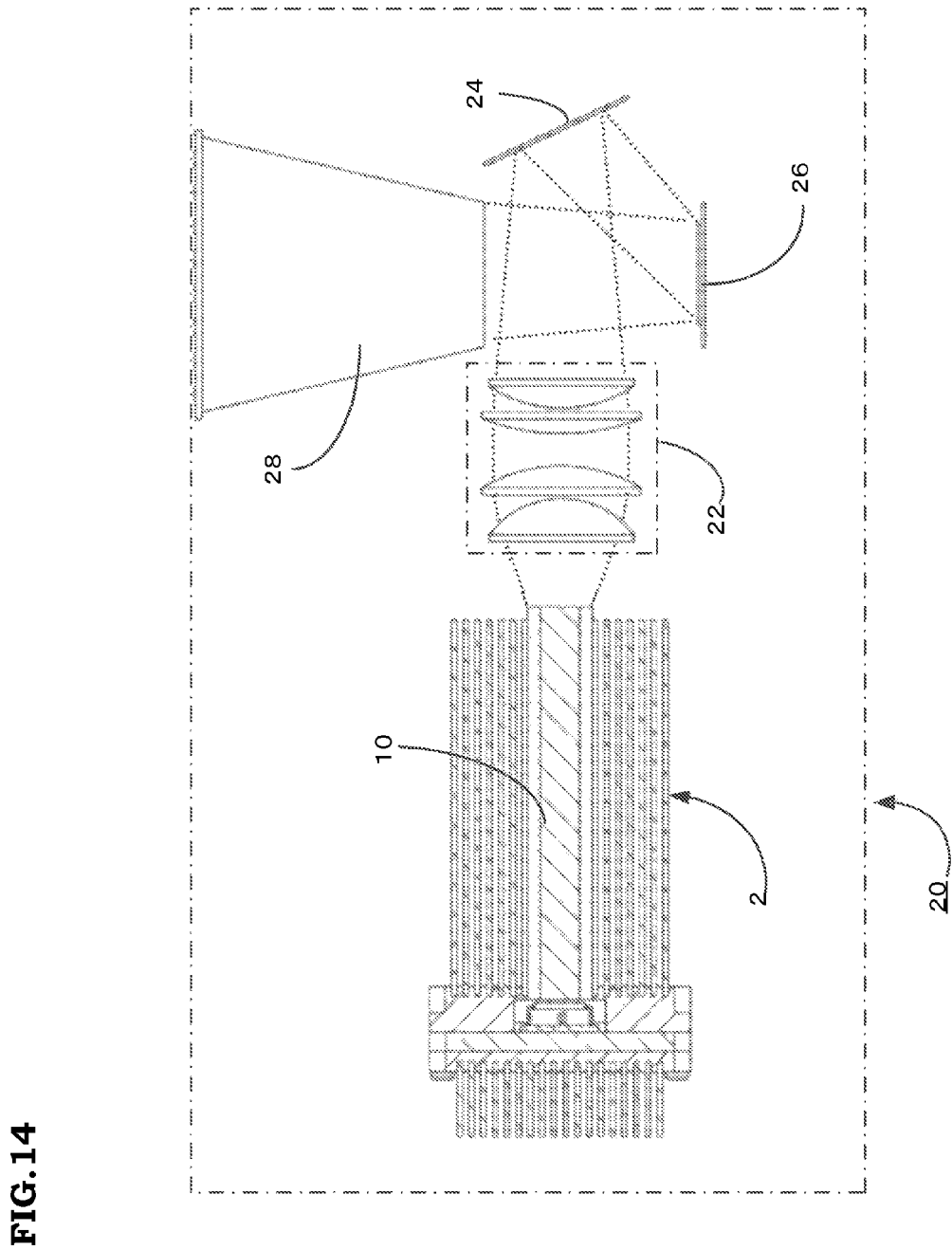
FIG. 14 illustrates a schematic diagram for describing the outline of the projector according to one embodiment of the present invention.

FIG. 14 illustrates a schematic diagram for describing a configuration of a projector having the light source apparatus according to the embodiments of the present invention.

The projector 20 has the light source apparatus 2, an optical system 22 for propagating and converging a light which exits from the light source apparatus 2, mirror(s) 24, an optical modulating device 26 and a projection optical system 28. A light which exits from the light source apparatus 2 is projected to the optical modulating device 26 by the optical system 22. The optical system 22 has one or plurality of lens(s) such that a light which exists from the exit surface of the optical multiplexing component of the light source apparatus 2 can be focused on the plane including a light receiving surface of the optical modulating device 26.

A light which exits from the light source apparatus 2 is modulated by the optical modulating device 26 according to the image signals, and the modulated image light is projected to the screen or the like by the projection optical system 28.

The optical modulating device 26 is configured by, for example, a modulating element such as micro mirrors, liquid crystal elements or the like, and a control device. The mirror 24 is provided for changing a light path, and the mirror 24 can be omitted according to the configuration of the projector.

According to the projector 20 configured as mentioned above, it can directly modulate a light with a uniform light intensity distribution which exits from the exit surface of the optical multiplexing component 10 of the light source apparatus 2, by the optical modulating device 26. Therefore, since additional optical device for making a spatially uniform light intensity distribution is not necessary, the number of components can be reduced, and thereby achieving a compact projector.

As mentioned above, according to the above mentioned embodiment, since a uniform light intensity distribution can be obtained at the exit surface of the optical multiplexing component 10 by using the optical multiplexing component 10 having a short total length, a compact light source apparatus 2 with high performance can be realized. Accordingly, a compact projector 20 with high performance, which has the light source apparatus 2 can also be provided.

Although the above mentioned embodiments are described in the case that the light source apparatus according to the present invention is used for the projector, it is not limited thereof, and the light source apparatus according to the present invention can be applied to various fields including the display device.

While the present invention has been described according to the embodiments with a certain degrees of details, contents of disclosure of the embodiments shall be varied in details of the configuration, and the combination of elements and the change of order in the embodiment can be realized without deviating from the scope of the claims and concepts of the present invention.

DESCRIPTION OF REFERENCE NUMBERS

2 Light Source Apparatus
4 Semiconductor Laser
6 Laser Module
7a Base Portion
7b Cap Portion
7c Window Portion
8 Holding Member
10 Optical Multiplexing Component
10a Holder
12 First Heat Dissipating Member
12a Through Hole Portion
14 Second Heat Dissipating Member
16 Cooling Fan
20 Projector
22 Optical System
24 Mirror
26 Optical Modulating Device
28 Projection Optical System

What is claimed is:

1. A light source apparatus comprising:
a laser module where first semiconductor laser(s) and second semiconductor laser(s) which emits a light of the wavelength different from that of said first semiconductor laser(s) are placed such that the emitting direction of each semiconductor laser is approximately the same and a short axis direction of a far field pattern of each semiconductor laser is approximately the same, and
an optical multiplexing component which a light which exits from said laser module enters without being converged,
wherein said first semiconductor laser(s) and said second semiconductor laser(s) are placed in mirror symmetry in said short axis direction at the exit surface of said laser module.

2. The light source apparatus according to claim 1,
wherein in each group of the semiconductor lasers divided by a center axis of said mirror symmetry, on the condition that if the semiconductor laser exists at the location of said center axis, such semiconductor laser is excluded from the group,
said first semiconductor laser(s) and said second semiconductor laser(s) are placed in mirror symmetry in said short axis direction.

3. A light source apparatus comprising:
a laser module where first semiconductor laser(s) and second semiconductor laser(s) which emits a light of the wavelength different from that of said first semiconductor laser(s) are placed such that the emitting direction of each semiconductor laser is approximately the same and a short axis direction of a far field pattern of each semiconductor laser is approximately the same, and
an optical multiplexing component which a light which exits from said laser module enters without being converged,
wherein a plurality of lines where said first semiconductor laser(s) and said second semiconductor laser(s) are aligned in said short axis direction are placed at the exit surface of said laser module,
wherein if only one semiconductor laser exists in the direction vertical to said lines, and said one semiconductor would be aligned in the same line of other semiconductor(s) by moving in the direction vertical to said lines, said first semiconductor laser(s) and said second semiconductor laser(s) are placed in mirror symmetry in said short axis direction.

4. The light source apparatus according to claim 3,
wherein in each group of the semiconductor laser(s) divided by a center axis of said mirror symmetry, on the condition that if the semiconductor laser exists at the location of said center axis, such semiconductor laser is excluded from the group,
said first semiconductor laser(s) and said second semiconductor laser(s) are placed in mirror symmetry in said short axis direction.

5. The light source apparatus according to claim 1,
wherein said first semiconductor laser(s) and said second semiconductor laser(s) are semiconductor laser(s) which emits a light in a green light range, and semiconductor laser(s) which emits a light in a blue light range.

6. The light source apparatus according to claim 5,
wherein at the exit surface of said laser module, a line where said first semiconductor laser(s) and said second semiconductor laser(s) are aligned in said short axis direction, and a line where semiconductor laser(s) which emits a light in a red light range is aligned.

7. The light source apparatus according to claim 1, wherein the wavelength ranges of said laser module include:
a red light range from 600 nm to 650 nm,
a green light range from 500 nm to 550 nm, and
a blue light range firm 440 nm to 490 nm.

8. The light source apparatus according to claim 1, wherein said optical multiplexing component is a solid rod integrator or a hollow light pipe, and
said optical multiplexing component has a shape of a square pole whose light transmitting sectional surface is approximately vertical to an optical axis of the light which exists from said semiconductor laser, and an area of the sectional surface of said optical multiplexing component is larger than a luminescence area of the exit surface of said laser module.

9. The light source apparatus according to claim 1, wherein a width dimension which is a dimension of said optical multiplexing component in said short axis direction is smaller than
"a total luminance point length + (a minimum one of adjacent luminance point lengths ×4)",
said total luminance point length being a distance of the optical axes of the semiconductor lasers located at the both ends in said short axis direction, and
said adjacent luminance point length being a distance of the optical axes of the semiconductor lasers located adjacently in said short axis direction.

10. The light source apparatus according to claim 1, wherein in the plurality of semiconductor lasers, a maximum one of the adjacent luminance point lengths is smaller than (a minimum one of adjacent luminance point lengths ×3),
said adjacent luminance point length being a distance of the optical axes of the semiconductor lasers located adjacently in said short axis direction.

11. The light source apparatus according to claim 1, wherein if a length dimension which is a dimension of said optical multiplexing component in a light transmitting direction being L, a width dimension which is a dimension of said optical multiplexing component in said short axis direction being D, a diverging angle in said short axis direction being $\theta_x$, and a refractive index being n,
the following formulas are fulfilled:

$$\frac{1}{2}D\sqrt{\frac{n^2 - NA^2}{NA^2}} < L < \frac{3}{2}D\sqrt{\frac{n^2 - NA^2}{NA^2}}$$

$$NA = \sin(\theta_x).$$

12. The light source apparatus according to claim 1, wherein if a length dimension which is a dimension of said optical multiplexing component in a light transmitting direction being L, a width dimension which is a dimension of said optical multiplexing component in said short axis direction being D, the following formula is fulfilled:

$$L < 22 \times D.$$

13. A projector comprising:
the light source apparatus according to claim 1, and
an optical system for forming images according to the light which exits from said light source apparatus.

14. The light source apparatus according to claim 2, wherein if a length dimension which is a dimension of said optical multiplexing component in a light transmitting direction being L, a width dimension which is a dimension of said optical multiplexing component in said short axis direction being D, a diverging angle in said short axis direction being $\theta_x$, and a refractive index being n,
the following formulas are fulfilled:

$$\frac{1}{2}D\sqrt{\frac{n^2 - NA^2}{NA^2}} < L < \frac{3}{2}D\sqrt{\frac{n^2 - NA^2}{NA^2}}$$

$$NA = \sin(\theta_x).$$

15. The light source apparatus according to claim 3, wherein if a length dimension which is a dimension of said optical multiplexing component in a light transmitting direction being L, a width dimension which is a dimension of said optical multiplexing component in said short axis direction being D, a diverging angle in said short axis direction being $\theta_x$, and a refractive index being n,
the following formulas are fulfilled:

$$\frac{1}{2}D\sqrt{\frac{n^2 - NA^2}{NA^2}} < L < \frac{3}{2}D\sqrt{\frac{n^2 - NA^2}{NA^2}}$$

$$NA = \sin(\theta_x).$$

16. The light source apparatus according to claim 4, wherein if a length dimension which is a dimension of said optical multiplexing component in a light transmitting direction being L, a width dimension which is a dimension of said optical multiplexing component in said short axis direction being D, a diverging angle in said short axis direction being $\theta_x$, and a refractive index being n,
the following formulas are fulfilled:

$$\frac{1}{2}D\sqrt{\frac{n^2 - NA^2}{NA^2}} < L < \frac{3}{2}D\sqrt{\frac{n^2 - NA^2}{NA^2}}$$

$$NA = \sin(\theta_x).$$

17. A projector comprising:
the light source apparatus according to claim 2, and
an optical system for forming images according to the light which exits from said light source apparatus.

18. A projector comprising:
the light source apparatus according to claim 3, and
an optical system for forming images according to the light which exits from said light source apparatus.

19. A projector comprising:
the light source apparatus according to claim 4, and
an optical system for forming images according to the light which exits from said light source apparatus.

* * * * *